United States Patent [19]

Roos

[11] 4,214,835
[45] Jul. 29, 1980

[54] SPECTROMETER SEQUENTIAL READOUT SYSTEM

[75] Inventor: Cees J. Roos, 'S Gravenzande, Netherlands

[73] Assignee: Baird Corporation, Bedford, Mass.

[21] Appl. No.: 150

[22] Filed: Jan. 2, 1979

Related U.S. Application Data

[63] Continuation-in-part of Ser. No. 803,617, Jun. 6, 1977, Pat. No. 4,140,394.

[51] Int. Cl.² .............................................. G01J 3/38
[52] U.S. Cl. ...................................... 356/306; 356/328
[58] Field of Search ......................... 356/306, 326, 328

[56] References Cited

U.S. PATENT DOCUMENTS

| | | | |
|---|---|---|---|
| 2,577,814 | 12/1951 | Saunderson et al. | 356/306 |
| 3,531,202 | 9/1970 | Wilkinson et al. | 356/306 |

Primary Examiner—F. L. Evans
Attorney, Agent, or Firm—Morse, Altman, Oates & Bello

[57] ABSTRACT

A spectrometer readout system with storage capacitors for temporarily storing output signals generated by a series of photomultiplier tubes that are positioned to monitor selected spectral lines. A voltage-time converter sequentially discharges the capacitors to a preset level and converts the stored voltages into signals that are linearly related to a known signal and an unknown signal. The output of the voltage-time converter defines the discharge time period which is measured and stored by a computer.

10 Claims, 5 Drawing Figures

SPECTROMETER SEQUENTIAL READOUT SYSTEM

CROSS-REFERENCE TO RELATED APPLICATIONS

The present invention is a continuation-in-part of my pending application Ser. No. 803,617, filed June 6, 1977 for Spectrometer Sequential Readout System, now U.S. Pat. No. 4,140,394.

BACKGROUND OF THE INVENTION

1. Field of the Invention

The present invention relates to spectrometer readout systems and, more particularly, is directed toward high-speed sequential readout spectrometer systems.

2. Description of the Prior Art

A direct reading spectrometer is an apparatus adapted to indicate automatically the chemical composition of a specimen for determining the intensity distribution of radiation of characteristic wavelengths emitted by the specimen under excitation. Typically, a direct reading spectrometer includes an entrance slit that transmits radiation from an electrically excited specimen against a diffraction grating which disperses the radiation into a spectrum. The spectrometer also includes a plurality of exit slits arrayed at selected spaced intervals for transmitting the radiation of preselected wavelengths to photocell channels in order to determine the differing intensities of the radiation at these wavelengths.

In the automatic spectrometer described in U.S. Pat. No. 3,531,202, the output of a series of photomultiplier tubes which are positioned to monitor selected spectral lines, is temporarily stored on capacitors. An analog to digital converter converts the stored voltages into digital form which is logarithmically related to a known signal and an unknown signal. The output of the converter, the log discharge time period, is measured and stored by a time register scaler. A computer and programmer are operatively connected to the converter and the register, the computer being adapted to provide an output which is a representation of the direct percentage of concentration of the monitored element. The programmer controls the sequence operation of the system and also provides an output to a disc or printer.

SUMMARY OF THE INVENTION

It is an object of the present invention to provide improvements in high-speed sequential readout spectrometer systems.

Another object of this invention is to provide a solid state high speed automatic sequential readout spectrometer system with simplified circuitry and increased flexibility.

The invention features a spectrometer readout system for temporarily storing the output signal of a series of photomultiplier tubes that are positioned to monitor selected spectral lines and a voltage-time converter for discharging the stored signals and converting the stored voltages into a form which is linearly related to a known signal and an unknown signal. The output of the converter is the discharge time period which is measured and stored by a computer. The computer or programmer controls sequential operations of the system and the computations for determining the concentration of the monitored element, and generates data signals to a tape, printer or the like.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
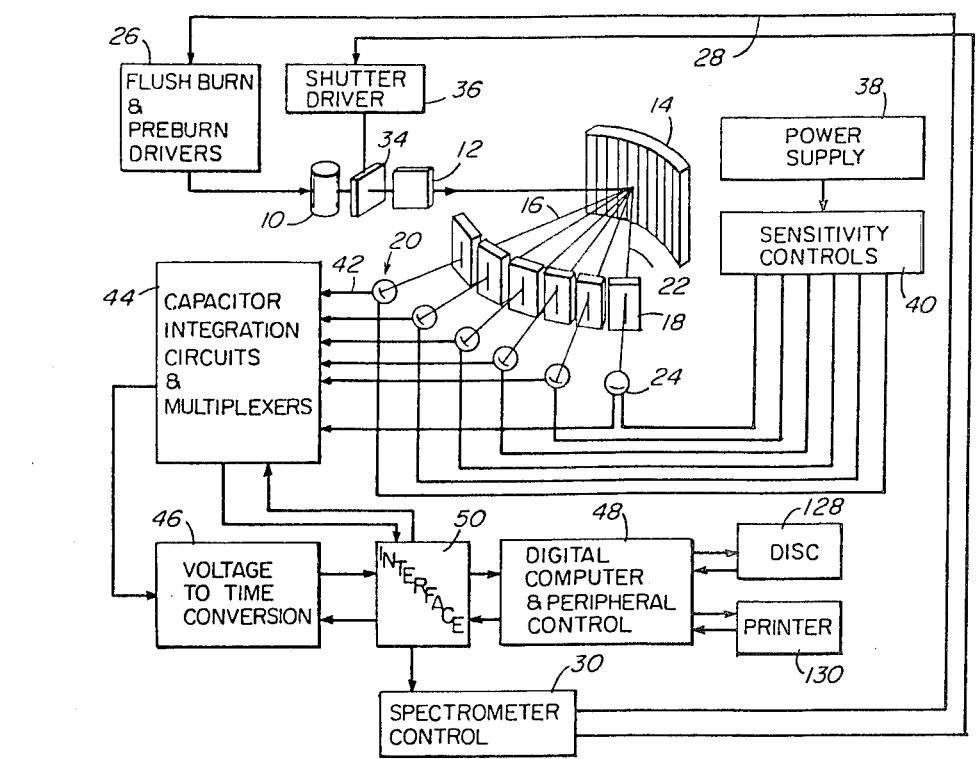
FIG. 1 is a block diagram, in somewhat schematic form, of a spectrometer readout system embodying the present invention.

Referring now to the drawings, particularly to FIG. 1, reference character 10 generally indicates an electrically excited gap in which a specimen is placed for excitation. The resulting radiation is passed through an entrance slit 12 against a curved diffraction grating 14 which disperses the radiation into a spectrum, rays of which are shown at 16. These spectral components pass through a plurality of exit slits 18 distributed in predetermined spaced relation in an arc oppositely the grating for transmitting isolated wavelength of the spectrum. A bank of photocell 20 is provided to receive wavelength 16 of which one will be considered as a reference spectrum line 22. In the illustrated embodiment, one of the photocells 20 that is positioned to receive reference spectrum line 22 is denoted by reference character 24. The photocells 20 are positioned to receive the spectrum lines 16 and each of the photocells generates a signal for a wavelength intensity comparison. The spark gap 10 is actuated by a drive unit 26 which receives appropriate timing signals by a lead 28 from a control unit 30. In practice, a shutter 34 is disposed between the spark gap 10 and the slit 12. The control unit 30 provides flush, burn and preburn control operations of the spark gap 10.

A shutter drive 36, also actuated by the control unit 30, is operatively connected to the shutter 34 and is adapted to open and close the shutter for preselected periods. The photocells 20, for example photomultiplier tubes, are energized from a suitable power source 38 provided with the usual sensitivity controls 40. The output of each photomultiplier tube is connected by leads 42 to capacitor integration circuits and multiplexers generally indicated by reference character 44 in FIG. 1.

In operation, the capacitors within the unit integrate the outputs of the photomultiplier tubes 20 during the exposure period. During the measurement cycle, the capacitor voltages are fed sequentially to a voltage-to-time conversion unit 46 in which measurements are performed. The output from conversion unit 46 is the discharge time period $t_x$ which is measured and stored by a digital computer 48 via an interface 50. The principles of operation for the system are presented in FIG. 2.

Figure 2:
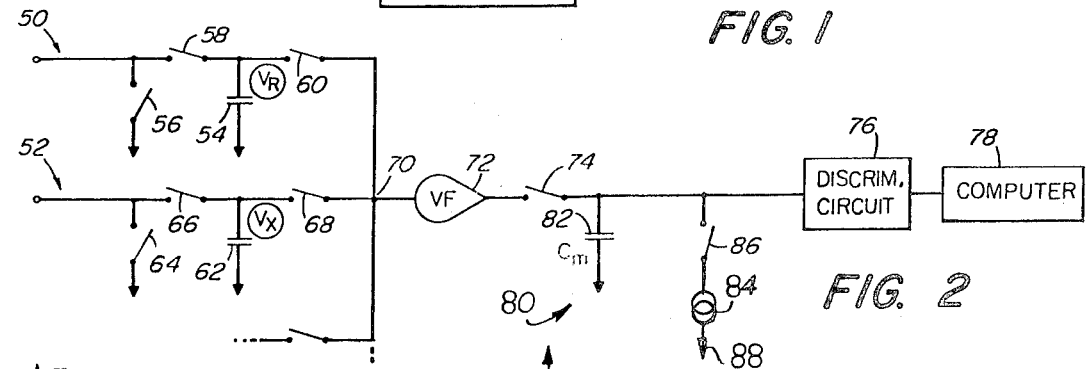
FIG. 2 is a simplified schematic diagram illustrating the transfer-discharge circuitry.

Referring now to FIG. 2, it will be seen that the output from reference photomultiplier tube 24 is applied to a reference section 50 and the outputs from element photomultiplier tubes 20 are applied selectively to element sections 52, one of which is shown. Reference section 50 includes an integration capacitor 54 and switching devices 56, 58, 60, for example, solid state MOFSET switches. Element section 52 includes an integration capacitor 62 and switching devices 64, 66 and 68, for example solid state MOFSET switches. In the illustrated embodiment, the sections for determining element concentration, reference or background are identical.

The output of each section is connected to a common junction 70 at the input of a voltage follower 72. A switch 74, for example a solid state MOFSET switch, is connected between the output of voltage follower 72 and the input of a lever sensor or discriminator 76, the output of which is connected to a digital computer 78 or a counter. A discharging network 80, which includes a measuring capacitor 82 and a constant-current device 84, is connected between switch 74 and discriminator 76. A switch 86, for example a solid state MOFSET switch, is connected between the input of discriminator 76 and one side of constant-current device 84, the other side of device 84 being connected to a return 88.

During the exposure period, each integration capacitor is charged to a particular voltage level defined by the output of its associated photomultiplier tube 20. That is, during the exposure period switches 56, 60 in the reference channel 50 and switches 64, 68 in the element channels 52 are opened and switches 58, 66 are closed. As shown in FIG. 2 of the drawings, the reference voltage on integration capacitor 54 is denoted by the symbol $V_r$ and the element voltage on integration capacitor 62 is defined by $V_x$. In the manner hereinafter described, the voltage on each integration capacitor is sequentially converted to a time period t which is measured and stored by digital computer 78. In the illustrated embodiment, the sequence of operation is controlled by computer 78.

Figure 3A:
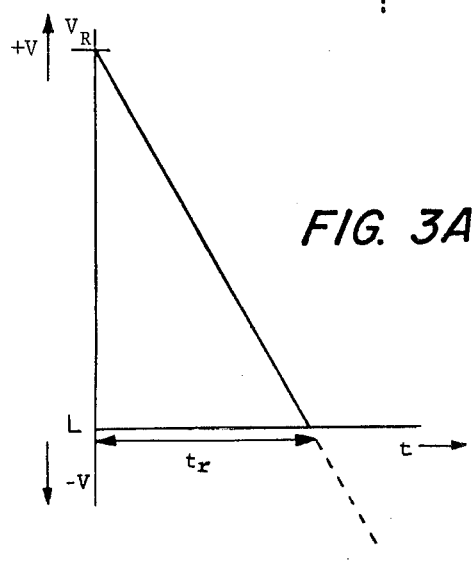
FIGS. 3A and 3B are waveforms illustrating certain principles of the invention.

After the exposure period, the isolation period is initiated and switches 58 and 66 are opened. It is to be understood that the other element capacitors are isolated also from their associated photomultiplier tubes by similar switching devices in their respective channels. During this isolation period, switch 86 is closed and measuring capacitor 82 is discharged. Next, switches 60 and 74 are closed and switch 86 is opened. In consequence, the voltage $V_r$ on reference capacitor 54 is transferred to measuring capacitor 82. Next, switches 60 and 74 are opened and switch 86 is closed. Measuring capacitor 82 is linearly charged in an opposite direction through switch 86 and constant-current device 84 to a preset level L (FIG. 3A) as established in discriminator 76. In the illustrated embodiment, by way of example, level L is 0 volts and the discharge-time ends at the moment that capacitor 82 voltage is 0 volts (discharge-line in FIG. 3A crosses the t-axis). Constant-current device 84 charges measuring capacitor 82 in a direction which is opposite to the charge thereon and discharges capacitor 82. The discharge time $t_r$ of the reference voltage $V_r$ on measuring capacitor 82 is stored in computer 78 for further computation.

Figure 3B:
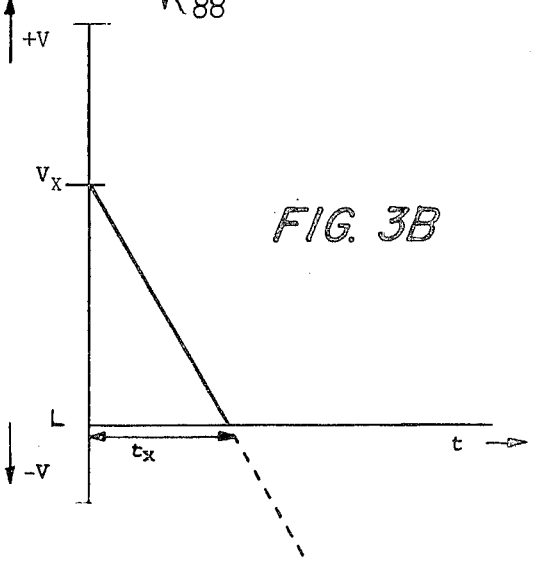

A similar operation is sequentially performed on each of the element capacitors. That is, switches 68 and 74 are closed and switch 86 is opened. The element voltage $V_x$ on element capacitor 62 is transfered to measuring capacitor 82. Next, switches 68 and 74 are opened and switch 86 is closed. Measuring capacitor 82 is discharged through switch 86 and constant-current device 84 to the preset level L of 0 volts (FIG. 3B), which is preset in discriminator 76. That is, discharge time constant of measuring capacitor 82 is the same for the reference voltage and for the element voltages, in each instance the measuring capacitor is discharged to the same level. The discharge time $t_e$ of element voltage $V_x$ on measuring capacitor 82 is stored in computer 78 for further computation. In a similar manner, the voltages stored on the remaining element capacitors are sequentially transferred to measuring capacitor 82 which is discharged at the completion of the transfer step of each element voltage.

Figure 4:
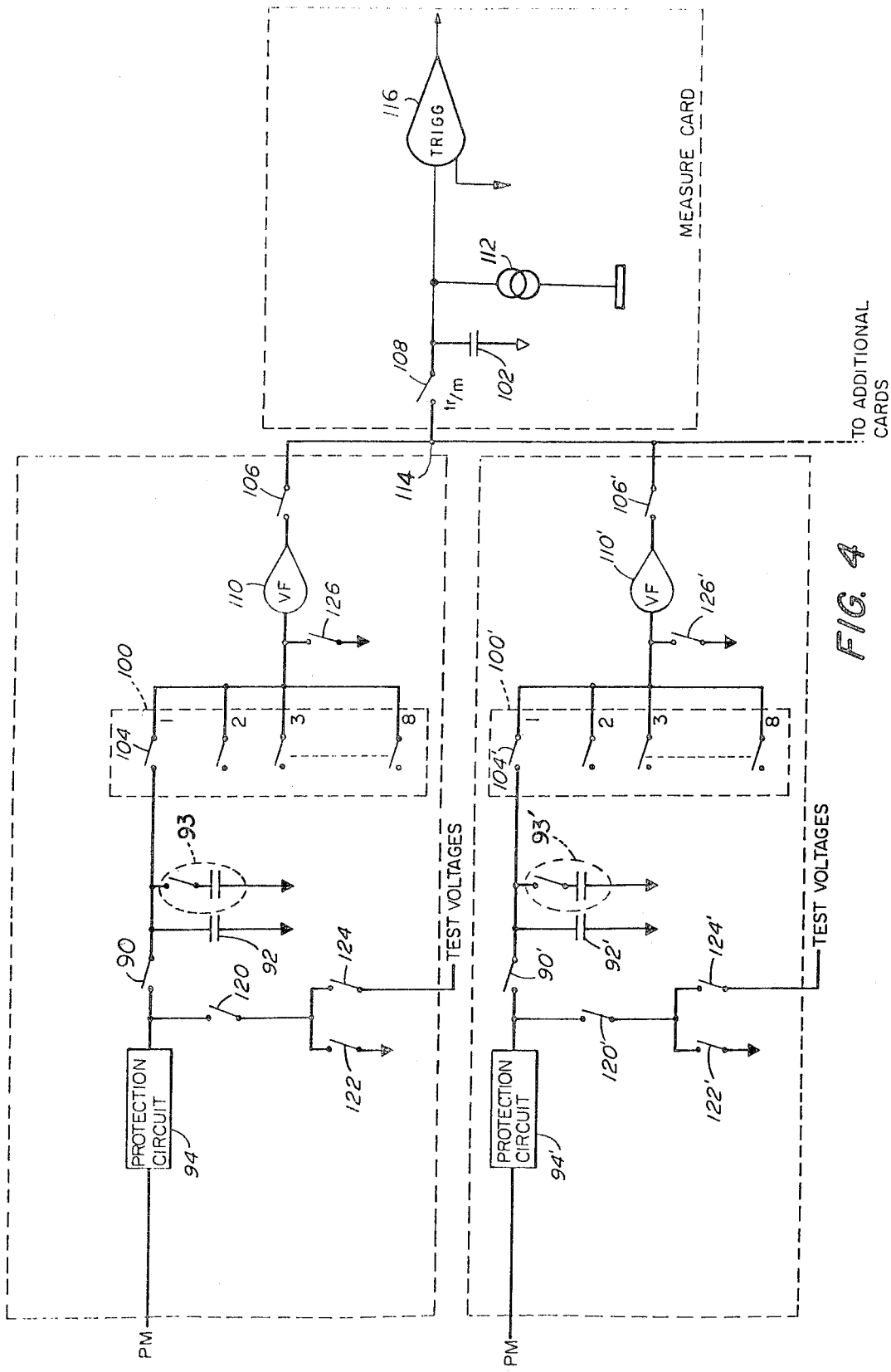
FIG. 4 is a schematic diagram of the sequential measurement system and voltage-to-time converter.

A basic implementation of the sequential measurement system and the voltage-to-time converter is shown in FIG. 4. As previously discussed in connection with FIG. 2, a plurality of like sections are associated with a series of photomultiplier tubes, one section receiving the output from one photomultiplier. In the schematic diagram of FIG. 4, two sections are shown, corresponding components of the like sections being distinguished by a prime notation. In alternative embodiments, it is to be understood that the number of sections is other than two, for example four, six or some other number. The circuitry now to be described utilizes high quality amplifiers, low leakage capacitors and high performance switches for optimum system performance and accuracy.

In the sequence of operations of the circuitry in FIG. 4, during the burn or exposure period, switches 90 and 90' are closed and integrating capacitors 92 and 92' integrate the photomultiplier tube output currents. The capacitance of integrating capacitors 92 and 92' can be varied by optional capacitor-switch networks 93 and 93', respectively. During the exposure period, switches 104 and 104' in multiplexers 100 and 100', respectively, are opened. Upon completion of the exposure period, swithces 90 and 90' are opened and integration capacitors 92 and 92' are disconnected from the photomultiplier tubes. Completion of the exposure period signals initiation of the measurement period.

During the measurement period, the charges on capacitors 92 and 92' are transferred sequentially to a measuring capacitor 102 through voltage followers 110 and 110', respectively. Firstly, measuring capacitor 102 is charged to the same voltage as exists on capacitor 92 by closing of switches 104, 106 and 108, switch 104 being a part of multiplexer 100. The charge on capacitor 92' is transferred through closed switch 104', voltage follower 110', switch 106', a common junction 114 and switch 108 to measuring capacitor 102. Since the input impedance of voltage follower 110 is extremely high, in the order of $10^{12}$ ohms, this operation is performed while leaving the voltage on capacitor 92 essentially unchanged. Having charged measuring capacitor 102, switch 108 is then opened and the measuring capacitor is linearly charged in an opposite direction to a predetermined level via a constant-current device 112. Constant-current device 112 charges measuring capacitor 102 in a direction which is opposite to the charge thereon and discharges the measuring capacitor. As soon as the voltage on measuring capacitor 102 has discharged to the preset level, trigger 116 generates a stop signal that is applied to a computer or counter (not shown) for terminating the counting period during which measuring capacitor is discharged. The voltages on the remaining integration capacitors are transferred sequentially to measuring capacitor 102, which is discharged at the end of each transfer period in the manner described.

As shown in FIG. 4 each section includes switches 120, 122, 124 and 126. When switches 120 and 124 are closed, a test voltage charges capacitor 92 to a known voltage. Integration capacitor 92 is discharged through closed switches 120 and 122. Switch 126 is provided for grounding the input of voltage follower 110.

The invention thus features a spectrometer readout system having a plurality of storage means for temporarily storing the output of a series of photomultiplier tubes positioned to monitor selected spectral lines and the voltage-to-time converter for converting the voltages stored in the storage means into a form which is related linearly to a known and an unknown signal by sequentially transferring the stored voltages to a measuring capacitor and discharging the measuring capacitor to a preset level after each transfer. The output of the voltage-to-time converter is the discharge time period which is measured and stored by a computer. The computer or programmer controls the sequence operations of the system, computation for determining the concentration of the monitored element, required corrections and provides an output to a disc 128, a printer 130 or the like.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. In a direct reading spectrometer for dispersing light from an excited specimen into its characteristic spectrum, an appartus for generating data signals related linearly to the concentration of elements in said specimen, said apparatus comprising:
   (a) a plurality of photocells mounted on said spectrometer for receiving different portions of said spectrum, each of said photocells converting light energy from a selected portion of the spectrum into electrical energy;
   (b) a plurality of storage means operatively connected to said photocells for storing an unknown electrical charge corresponding to the intensity of the monitored spectrum portion, each one of said storage means being connected to only one of each of said photocells, one of said storage means operatively connected to one of said photocells at a reference position for storing a charge corresponding to the intensity of a reference portion of said spectrum;
   (c) a measuring capacitor;
   (d) first means for controlling the sequence of operation of the parts of the apparatus;
   (e) first switching means controlled by said first means and connected between said storage means and said measuring capacitor for sequentially transferring said stored charge on said storage means to said measuring capacitor; and
   (f) second means for discharging said measuring capacitor to a predetermined level;
   (g) said measuring capacitor is discharged to said predetermined level after each said transfer of said stored charge on each said storage means to said measuring capacitor by said first switching means, the time period during which said measuring capacitor is discharged for each said storage means is the discharge time period for the element associated with that storage means.

2. The apparatus as claimed in claim 1 wherein said storage means are capacitors.

3. The apparatus as claimed in claim 1 wherein said second means includes a discriminator and constant-current means, said constant-current means connected between an input of said discriminator and a return, second switching means controlled by said first means and connected to said constant-current for discharging said measuring capacitor.

4. The apparatus as claimed in claim 3 including third switching means controlled by said first means and connected between said photocells and said storage means for isolating said storage means from its associated photocell.

5. The apparatus as claimed in claim 4 including a voltage follower and fourth switching means, said first switching means connected between each of said storage means and an input of said voltage follower, said fourth switching means controlled by said first means and connected between an output of said voltage follower and said measuring capacitor.

6. The apparatus as claimed in claim 1 wherein said first means includes a computer which stores said discharge time period.

7. In a direct reading spectrometer for dispersing light from an excited specimen into its characteristic spectrum, an apparatus for generating data signal linearly related to the concentration of elements in said specimen, said apparatus comprising:
   (a) a plurality of photomultiplier tubes mounted on said spectrometer for receiving different portions of said spectrum, each said photomultiplier tube converting light energy from a selected portion of the spectrum into electrical energy;
   (b) a plurality of storage capacitors operatively connected to said photomultiplier tubes for storing an unknown electrical charge corresponding to the intensity of the monitored spectrum portion, each one of said storage capacitors being connected to only one of each of said photomultiplier tubes, one of said storage capacitors operatively connected to one of said photomultiplier tubes at a reference position for storing a charge corresponding to the intensity of a reference portion of said spectrum;
   (c) a measuring capacitor;
   (d) a computer for controlling the sequence of operation of the parts of the apparatus;
   (e) first switching means controlled by said computer for connecting and disconnecting said storage capacitors and said photomultiplier tubes;
   (f) second switching means controlled by said computer for connecting and disconnecting said storage capacitors and said measuring capacitor; and
   (g) means for discharging said measuring capacitor to a predetermined level;
   (h) said second switching means sequentially connecting said storage capacitors to said measuring capacitor for sequentially transferring said charge stored on said storage capacitors to said measuring capacitor, said measuring capacitor is discharged to said predetermined level after each said transfer, the time period during which said measuring capacitor is discharged is stored in said computer, said time period during which said measuring capacitor is discharged constitutes the discharge time period for the element associated with said storage capacitor from which the stored charge is transferred to said measuring capacitor.

8. The apparatus as claimed in claim 7 wherein said means for discharging includes constant-current means and discriminator means, said measuring capacitor discharges through said constant-current means until said measuring capacitor is discharged to said predetermined level established by said discriminator means.

9. The apparatus as claimed in claim 8 including third switching means controlled by said computer for connecting and disconnecting said measuring capacitor and said constant-current means, said measuring capacitor is discharged when said constant-current means and said measuring capacitor are connected.

10. The apparatus as claimed in claim 9 including a voltage follower connected between said storage capacitors and said measuring capacitor.

* * * * *